(12) United States Patent
Sekhar

(10) Patent No.: US 12,621,278 B2
(45) Date of Patent: May 5, 2026

(54) METHOD AND SYSTEM FOR PROVIDING A SECURE COMMUNICATION

(71) Applicant: JPMorgan Chase Bank, N.A., New York, NY (US)

(72) Inventor: Devaraj Naga Chandra Sekhar, Anantapur (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 18/823,336

(22) Filed: Sep. 3, 2024

(65) Prior Publication Data

US 2025/0097205 A1    Mar. 20, 2025

(30) Foreign Application Priority Data

Sep. 14, 2023    (IN) .............................. 202311061949

(51) Int. Cl.
    *H04L 9/40*            (2022.01)
(52) U.S. Cl.
    CPC ...... *H04L 63/0442* (2013.01); *H04L 63/0823* (2013.01)
(58) Field of Classification Search
    CPC ........................ H04L 63/0442; H04L 63/0823
    USPC ........................................................ 713/168
    See application file for complete search history.

(56) References Cited

U.S. PATENT DOCUMENTS

| | | | | |
|---|---|---|---|---|
| 8,117,438 | B1 * | 2/2012 | Albisu .................. | H04L 51/222 |
| | | | | 726/13 |
| 10,715,497 | B1 * | 7/2020 | Maeng .................. | H04L 63/126 |
| 11,005,829 | B1 * | 5/2021 | Johnson .................. | H04L 9/083 |
| 11,747,969 | B1 * | 9/2023 | Karunamuni ....... | G06F 3/04886 |
| | | | | 715/767 |
| 2022/0278826 | A1 * | 9/2022 | Jabbour ................ | H04L 9/0637 |
| 2022/0385641 | A1 * | 12/2022 | Pabst .................. | H04W 12/041 |
| 2023/0208621 | A1 * | 6/2023 | Gottschalk ............ | H04L 9/3268 |
| | | | | 713/171 |

* cited by examiner

*Primary Examiner* — Michael S McNally
(74) *Attorney, Agent, or Firm* — GREENBLUM & BERNSTEIN, P.L.C.

(57)            ABSTRACT

A method and a system for providing a secure communication are disclosed. The method includes receiving a request to install an application for the secure communication between a first entity and a second entity. Next, the method includes generating a certificate for the secure communication between the first entity and the second entity. Next, the method includes extracting a first key and a second key from the certificate. Next, the method includes sharing the first key with the second entity for encryption of a message in the secure communication. Next, the method includes receiving the encrypted message from the second entity. Next, the method includes decrypting the encrypted message using the second key. Thereafter, the method includes displaying the decrypted message in the application.

18 Claims, 6 Drawing Sheets

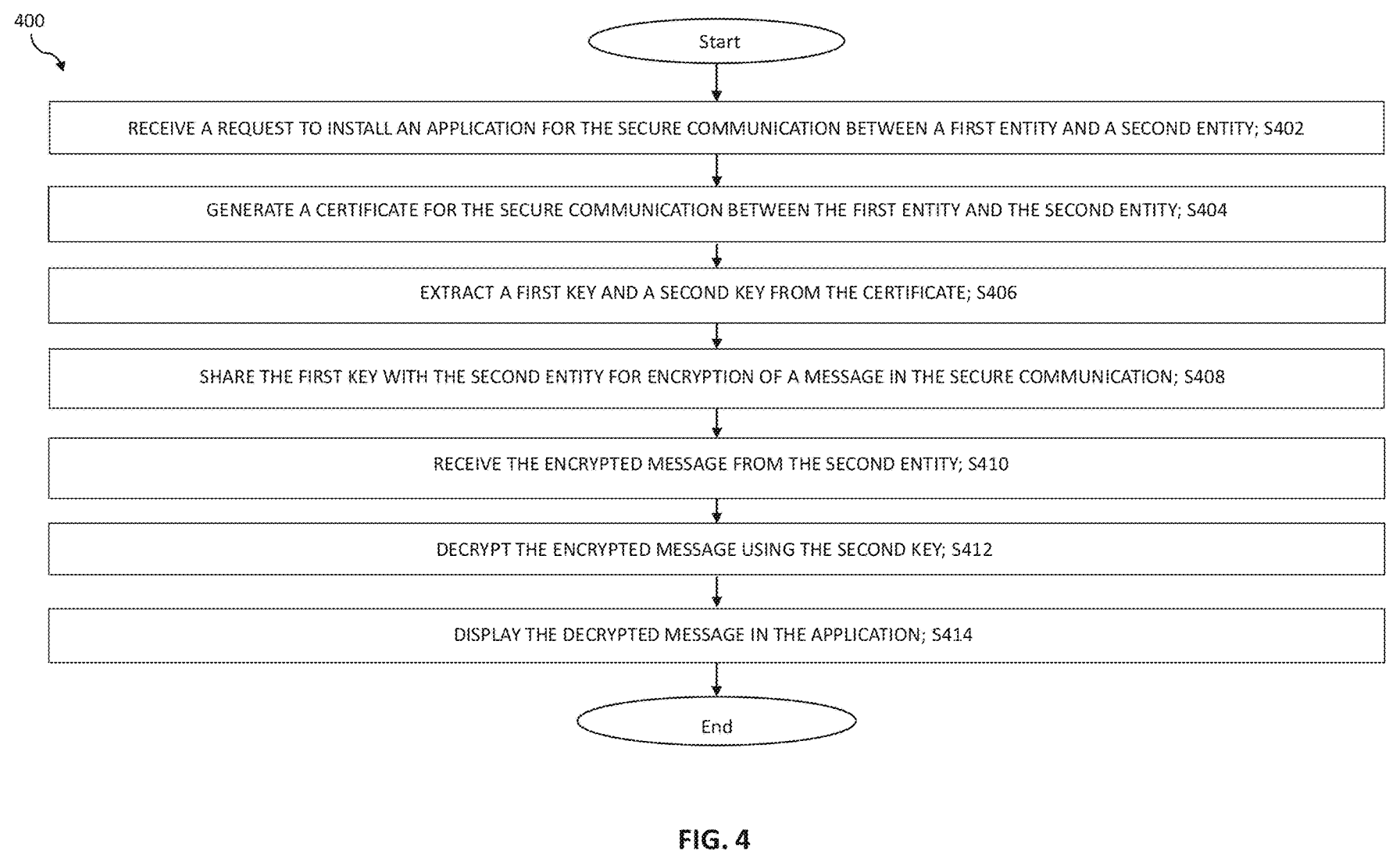

400

Start

RECEIVE A REQUEST TO INSTALL AN APPLICATION FOR THE SECURE COMMUNICATION BETWEEN A FIRST ENTITY AND A SECOND ENTITY; S402

GENERATE A CERTIFICATE FOR THE SECURE COMMUNICATION BETWEEN THE FIRST ENTITY AND THE SECOND ENTITY; S404

EXTRACT A FIRST KEY AND A SECOND KEY FROM THE CERTIFICATE; S406

SHARE THE FIRST KEY WITH THE SECOND ENTITY FOR ENCRYPTION OF A MESSAGE IN THE SECURE COMMUNICATION; S408

RECEIVE THE ENCRYPTED MESSAGE FROM THE SECOND ENTITY; S410

DECRYPT THE ENCRYPTED MESSAGE USING THE SECOND KEY; S412

DISPLAY THE DECRYPTED MESSAGE IN THE APPLICATION; S414

End

FIG. 4

METHOD AND SYSTEM FOR PROVIDING A SECURE COMMUNICATION

CROSS-REFERENCE TO RELATED APPLICATIONS

This application claims priority benefit from Indian Application No. 202311061949, filed on Sep. 14, 2023 in the India Patent Office, which is hereby incorporated by reference in its entirety.

FIELD OF THE DISCLOSURE

This technology generally relates to methods and systems for providing a secure communication, and more particularly to methods and systems for providing the secure communication between a first entity and a second entity using a certificate-based encryption and decryption mechanism.

BACKGROUND INFORMATION

The following description of the related art is intended to provide background information pertaining to the field of the present disclosure. This section may include certain aspects of the art that may be related to various features of the present disclosure. However, it should be appreciated that this section is used only to enhance the understanding of the reader with respect to the present disclosure, and not as admission of the prior art.

As is generally known, in the new era of the digital world, a user's day-to-day tasks are performed using a communication device such as smart phone, tablet, mobile phone, and the like. The user's day-to-day tasks may include shopping activities, financial transaction-related activities, messaging activities, communication activities, and the like. To perform these tasks, the user may get various types of notifications or alerts via different supported channels. A notification in the form of a short message service (SMS) is one such notification, which plays an important role in communicating the necessary information to the user. For instance, the SMS notification may be received for any service request such as a banking service request or a financial service request. Further, the use of the SMS-based service is one of the traditional ways to enable communication between users.

The major drawback in the conventional process of receiving and sending SMS or messages is the problem associated with the security of the SMS. SMS messages or notifications reach from one end to the other end through various short message service center (SMSC) channels and vendors' supports, which pose a threat of middle-man attack. Further, there are various third-party applications, which may also read SMS in the inbox based on allowed read permission. Also, any unauthenticated user may access confidential information like one time password (OTP) related to financial transactions, in case of a mobile phone loss situation, which may lead to a huge loss to the user. Therefore, sensitive services such as financial banking services or user personal sensitive communication are required to be secure to prevent any loss to the user.

Hence, in view of these and other existing limitations, there arises an imperative need to provide an efficient solution to overcome the above-mentioned limitations and to provide a method and system for providing a secure communication between different entities such as users or organizations.

SUMMARY

The present disclosure, through one or more of its various aspects, embodiments, and/or specific features or sub-components, provides, inter alia, various systems, servers, devices, methods, media, programs, and platforms for providing a secure communication between two parties.

According to an aspect of the present disclosure, a method for providing a secure communication is disclosed. The method is implemented by at least one processor. The method includes receiving, by the at least one processor, a request to install an application for the secure communication between a first entity and a second entity. Next, the method includes generating, by the at least one processor, a certificate for the secure communication between the first entity and the second entity. Next, the method includes extracting, by the at least one processor, a first key and a second key from the certificate. Next, the method includes sharing, by the at least one processor, the first key with the second entity for encryption of a message in the secure communication. Next, the method includes receiving, by the at least one processor, the encrypted message from the second entity. Next, the method includes decrypting, by the at least one processor, the encrypted message using the second key. Thereafter, the method includes displaying, by the at least one processor via a display, the decrypted message in the application.

In accordance with an exemplary embodiment, when the first entity corresponds to a receiver of the message, the second entity may correspond to a sender of the message; and when the second entity corresponds to the receiver of the message, the first entity may correspond to the sender of the message.

In accordance with an exemplary embodiment, the method may further include securing, by the at least one processor, the application with at least one multi-factor authentication factor.

In accordance with an exemplary embodiment, the generating of the certificate may correspond to an importing of the certificate from a certificate authority.

In accordance with an exemplary embodiment, the first key may correspond to a public key and the second key may correspond to a private key.

In accordance with an exemplary embodiment, the sharing of the first key with the second entity may include: receiving, by the at least one processor from the first entity, a request to securely connect with the second entity; sharing, by the at least one processor, the first key with the second entity for encryption of the message; and receiving, by the at least one processor from the second entity, an acknowledgment that indicates a successful receipt of the first key.

According to another aspect of the present disclosure, a computing device configured to implement an execution of a method for providing a secure communication is disclosed. The computing device includes a processor; a memory; and a communication interface coupled to each of the processor and the memory. The processor may be configured to receive a request to install an application for a secure communication between a first entity and a second entity. Next, the processor may be configured to generate a certificate for the secure communication between the first entity and the second entity. Next, the processor may be configured to extract a first key and a second key from the certificate. Next, the processor may be configured to share the first key with the second entity for encryption of a message in the secure communication. Next, the processor may be configured to receive the encrypted message from the second entity. Next, the processor may be configured to decrypt the encrypted message using the second key. Next, the processor may be configured to display the decrypted message in the application.

In accordance with an exemplary embodiment, when the first entity corresponds to a receiver of the message, the second entity corresponds to a sender of the message; and when the second entity corresponds to the receiver of the message, the first entity corresponds to the sender of the message.

In accordance with an exemplary embodiment, the processor may be further configured to secure the application with at least one multi-factor authentication factor.

In accordance with an exemplary embodiment, the generation of the certificate may correspond to an importation of the certificate from a certificate authority.

In accordance with an exemplary embodiment, the first key may correspond to a public key and the second key may correspond to a private key.

In accordance with an exemplary embodiment, the processor may be further configured to perform the sharing of the first key with the second entity by receiving a request from the first entity to securely connect with the second entity, sharing the first key with the second entity for encryption of the message, and receiving an acknowledgment from the second entity that indicates a successful receipt of the first key.

According to yet another aspect of the present disclosure, a non-transitory computer-readable storage medium storing instructions for providing a secure communication is disclosed. The instructions may include executable code which, when executed by a processor, may cause the processor to receive a request to install an application for a secure communication between a first entity and a second entity; generate a certificate for the secure communication between the first entity and the second entity; extract a first key and a second key from the certificate; share the first key with the second entity for encryption of a message in the secure communication; receive the encrypted message from the second entity; decrypt the encrypted message using the second key; and display the decrypted message in the application.

In accordance with an exemplary embodiment, when the first entity corresponds to a receiver of the message, the second entity corresponds to a sender of the message; and when the second entity corresponds to the receiver of the message, the first entity corresponds to the sender of the message.

In accordance with an exemplary embodiment, the executable code when executed may further cause the processor to secure the application with at least one multi-factor authentication factor.

In accordance with an exemplary embodiment, the generation of the certificate may correspond to an importation of the certificate from a certificate authority.

In accordance with an exemplary embodiment, the first key may correspond to a public key and the second key may correspond to a private key.

In accordance with an exemplary embodiment, the executable code when executed may further cause the processor to perform the sharing of the first key with the second entity by receiving a request from the first entity to securely connect with the second entity, sharing the first key with the second entity for encryption of the message, and receiving an acknowledgment from the second entity that indicates a successful receipt of the first key.

BRIEF DESCRIPTION OF THE DRAWINGS

The present disclosure is further described in the detailed description which follows, in reference to the noted plurality of drawings, by way of non-limiting examples of exemplary embodiments of the present disclosure, in which like characters represent like elements throughout the several views of the drawings.

FIG. 4 illustrates an exemplary method flow diagram for providing a secure communication, in accordance with an exemplary embodiment of the present disclosure.

DETAILED DESCRIPTION

Figure 1:
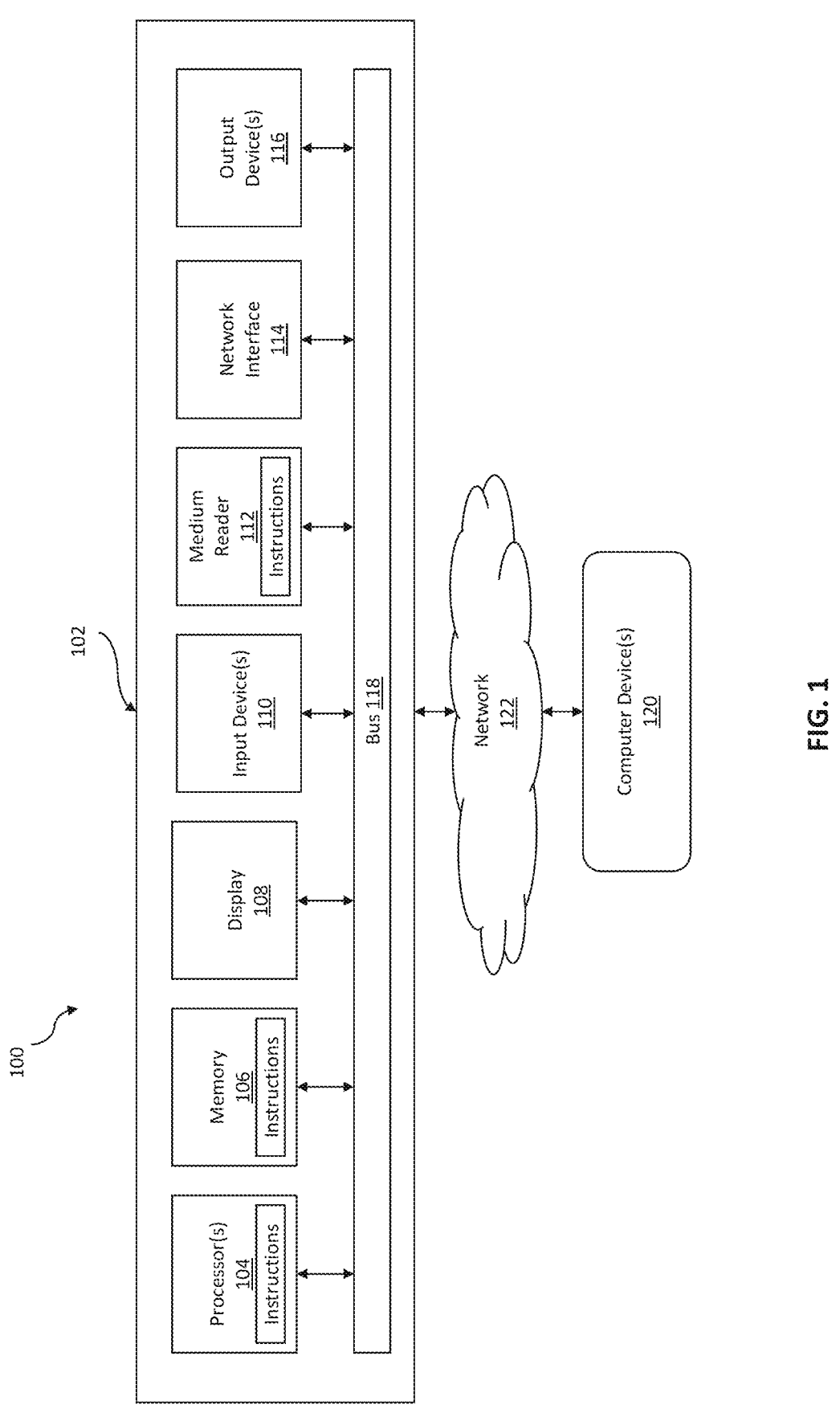
FIG. 1 illustrates an exemplary computer system for providing a secure communication, in accordance with an exemplary embodiment of the present disclosure.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to enable other embodiments.

As used herein, the singular forms "a", "an" and "the" are intended to include the plural forms as well, unless expressly stated otherwise. It will be further understood that the terms "include", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or"

includes any and all combinations and arrangements of one or more of the associated listed items. Also, as used herein, the phrase "at least one" means and includes "one or more" and such phrases or terms can be used interchangeably.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units and/or controllers described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

In the following description, for the purposes of explanation, numerous specific details have been set forth in order to enable a description of the invention. It will be apparent, however, that the invention may be practiced without these specific details and features.

Through one or more of its various aspects, embodiments and/or specific features or sub-components of the present disclosure, are intended to bring out one or more of the advantages as specifically described above and noted below.

The examples may also be embodied as one or more non-transitory computer-readable storage media having instructions stored thereon for one or more aspects of the present technology as described and illustrated by way of the examples herein. The instructions in some examples include executable code that, when executed by one or more processors, causes the processors to carry out steps necessary to implement the methods of the examples of this technology that are described and illustrated herein.

To overcome the problems associated with insecure message communication, the present disclosure provides a method and system for providing a secure communication between at least two entities. In an exemplary implementation, the at least two entities may communicate with each other using messaging services, such as short message service (SMS) service, for any personal communication or for any service-based request communication.

In an exemplary implementation, the present system receives a request from a first entity (e.g., a first user) to install an application to enable secure communication with a second entity (e.g., a second user). Next, the system provides an authentication mechanism to allow access to the application to the first entity and to prevent any third party from accessing the application. In an example, the authentication mechanism may include, but is not limited to, face authentication, fingerprint authentication, and a personal identification number (PIN) based authentication. Next, the first entity provides an input for adding the second entity to make the communication secure with the second entity. In an example, the first entity provides a contact number or code associated with the second entity as an input to make the communication secure with the second entity.

In an exemplary implementation, the first entity may add the second entity with whom the first entity wants to establish the secure communication. Next, the system either generates a certificate or imports the certificate from a third-party vendor to make the communication secure between the first entity and the second entity. The certificate includes a private key and a public key. The system shares the public key with the second entity and keeps the private key in the installed application. In an example, the system shares the public key by making multiple calls or SMS to the second entity and holds the private key securely in the application. After sharing the public key, the system also receives an acknowledgment from the second entity to confirm that the second entity has received the public key successfully. Thereafter, the first entity communicates with the second entity securely. In an example, user A wants to communicate with user B after making a secure connection e.g., after sharing public keys. User A receives an encrypted message from user B, where the message is encrypted using the received public key. The message received by user A is shown in the encrypted form in a general short message service (SMS)-based application, thereby preventing any third party from reading the message. However, user A may read the message using the installed secure application which decrypts the received message using the private key. Therefore, the present disclosure aids in the easier and more secure resolution for SMS-based communication.

FIG. 1 is an exemplary system for use in accordance with the embodiments described herein. The system 100 is generally shown and may include a computer system 102, which is generally indicated. The term "computer system" may also be referred to as "computing device" and such phrases/terms can be used interchangeably in the specifications.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud-based environment. Even further, the instructions may be operative in such cloud-based computing environment.

In a networked deployment, the computer system 102 may operate in the capacity of a server or as a client-user computer in a server-client user network environment, a client-user computer in a cloud-based computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smartphone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. Processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. Processor 104 is an article of manufacture and/or a machine component. The processor 104 is configured to execute software instructions in order to perform functions as described in the various embodiments herein. The processor 104 may be a general-purpose processor or may be part of an application-specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes a discrete gate and/or transistor logic. The processor 104 may be a central processing unit (CPU), a graphics processing unit (GPU), or both. Additionally, any processor described herein may include multiple processors, parallel processors, or both. Multiple processors may be included in or coupled to a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable storage mediums from which data and executable instructions can be read by a computer. Memories, as described herein, may be random access memory (RAM), read-only memory (ROM), flash memory, electrically programmable read-only memory (EPROM), electrically erasable programmable read-only memory (EEPROM), registers, a hard disk, a cache, a removable disk, tape, compact disk read-only memory (CD-ROM), digital versatile disk (DVD), floppy disk, Blu-ray disk, or any other form of storage medium known in the art. Memories may be volatile or non-volatile, secure and/or encrypted, unsecure and/or unencrypted. As regards the present disclosure, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as but not limited to, a network interface 114 and an output device 116. The output device 116 may be, but is not limited to, a speaker, an audio out, a video out, a remote-control output, a printer, or any combination thereof. Additionally, the term "Network interface" may also be referred to as "Communication interface" and such phrases/terms can be used interchangeably in the specification.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect expresses, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near-field communication, ultra-band, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present disclosure, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present disclosure. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments disclose methods and systems for providing a secure communication between the at least two entities.

Figure 2:
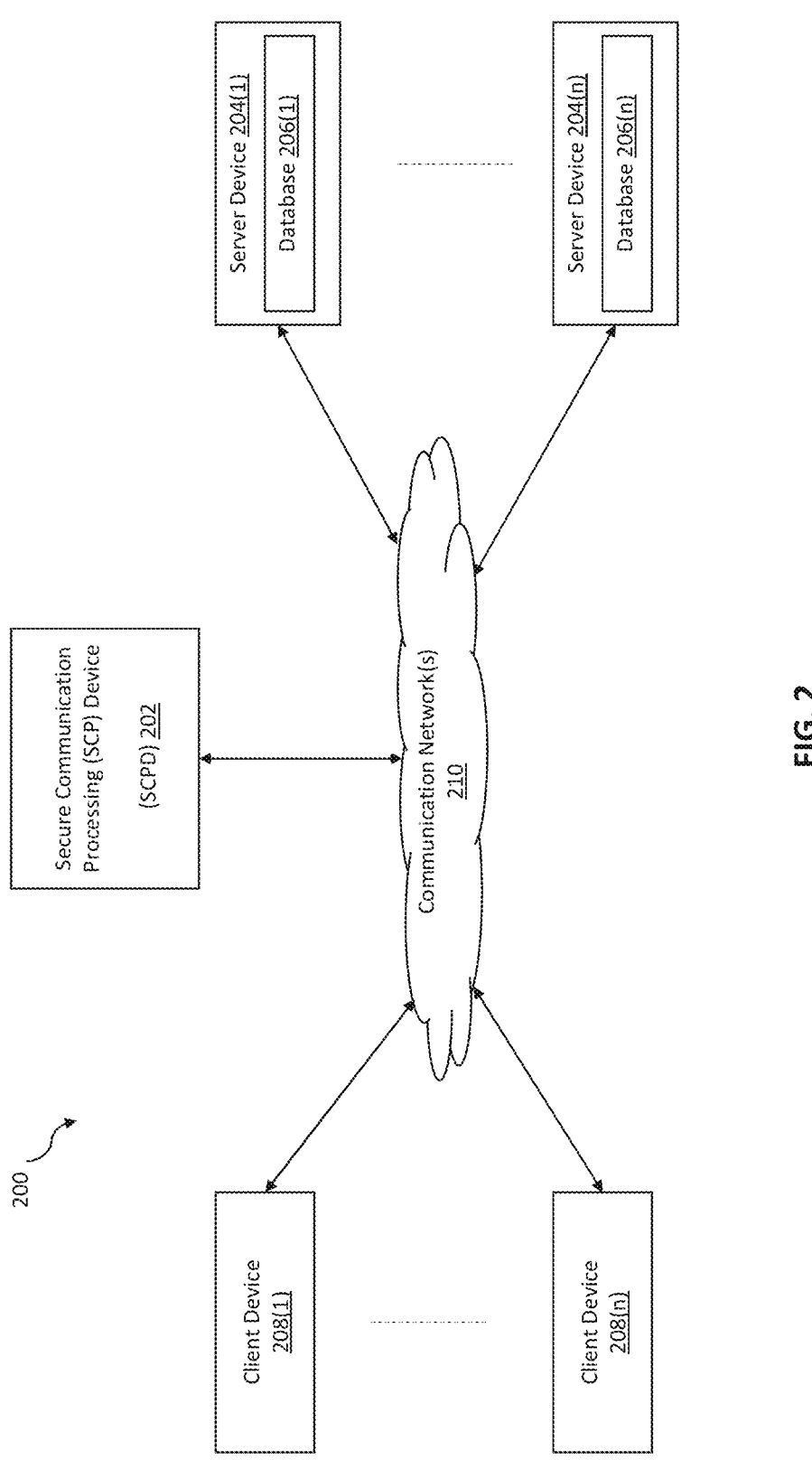
FIG. 2 illustrates an exemplary diagram of a network environment for providing a secure communication, in accordance with an exemplary embodiment of the present disclosure.

Referring to FIG. 2, a schematic of an exemplary network environment 200 for implementing a method for providing a secure communication is illustrated. In an exemplary implementation, the method is executable on any networked computer platform, such as, for example, a personal computer (PC).

The method for providing secure communication may be executed by a secure communication processing device (SCPD) 202. The SCPD 202 may be the same or similar to the computer system 102 as described with respect to FIG. 1. The SCPD 202 may store one or more applications that may include executable instructions that, when executed by the SCPD 202, cause the SCPD 202 to perform desired actions, such as to transmit, receive, or otherwise process network messages, for example, and to perform other actions described and illustrated below with reference to the figures. The application(s) may be implemented as modules or components of other applications. Further, the application(s) may be implemented as operating system extensions, modules, plugins, or the like.

In a non-limiting example, the application(s) may be operative in a cloud-based computing environment. The application(s) may be executed within or as a virtual machine(s) or virtual server(s) that may be managed in a cloud-based computing environment. Also, the application(s), and even the SCPD 202 itself, may be located in the virtual server(s) running in a cloud-based computing environment rather than being tied to one or more specific physical network computing devices. Also, the application(s) may be running in one or more virtual machines (VMs) executing on the SCPD 202. Additionally, in one or more embodiments of this technology, virtual machine(s) running on the SCPD 202 may be managed or supervised by a hypervisor.

In the network environment 200 of FIG. 2, the SCPD 202 is coupled to a plurality of server devices 204(1)-204(n) that hosts a plurality of databases 206(1)-206(n), and also to a plurality of client devices 208(1)-208(n) via communication network(s) 210. A communication interface of the SCPD 202, such as the network interface 114 of the computer system 102 of FIG. 1, operatively couples and communicates between the SCPD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SCPD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides several advantages including methods, non-transitory computer-readable media, and SCPDs that efficiently implement the method for providing a secure communication.

By way of example only, the communication network(s) 210 may include local area network(s) (LAN(s)) or wide area network(s) (WAN(s)) and can use transmission control protocol/internet protocol (TCP/IP) over Ethernet and industry-standard protocols, although other types and/or numbers of protocols and/or communication networks may be used. The communication network(s) 210 in this example may employ any suitable interface mechanisms and network communication technologies including, for example, tele traffic in any suitable form (e.g., voice, modem, and the like), public switched telephone networks (PSTNs), ethernet-based packet data networks (PDNs), combinations thereof, and the like.

The SCPD 202 may be a standalone device or integrated with one or more other devices or apparatuses, such as one or more of the server devices 204(1)-204(n), for example. In one particular example, the SCPD 202 may include or be hosted by one of the server devices 204(1)-204(n), and other arrangements are also possible. Moreover, one or more of the devices of the SCPD 202 may be in a same or a different communication network including one or more public, private, or cloud-based networks.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. In an example, the server devices 204(1)-204(n) may process requests received from the SCPD 202 via the communication network(s) 210 according to the hypertext transfer protocol (HTTP)-based and/or JavaScript object notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases or repositories 206(1)-206(*n*) that are configured to store data associated with the developer utility platform.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a controller/agent approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to-peer architecture, virtual machines, or within a cloud-based architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208 (1)-208(*n*) in this example may include any type of computing device that can interact with the SCPD 202 via communication network(s) 210. Accordingly, the client devices 208(1)-208(*n*) may be mobile computing devices, desktop computing devices, laptop computing devices, tablet computing devices, or the like, that host chat, e-mail, or voice-to-text applications, for example. In an exemplary implementation, at one client device 208 is a wireless mobile communication device, e.g., a smartphone.

The client devices 208(1)-208(*n*) may run interface applications, such as standard web browsers or standalone client applications, which may provide an interface to communicate with the SCPD 202 via the communication network(s) 210 in order to communicate user requests and information. The client devices 208(1)-208(*n*) may further include, among other features, a display device, such as a display unit or touchscreen, and/or an input device, such as a keyboard, for example.

Although the exemplary network environment 200 with the SCPD 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SCPD 202, the server devices 204(1)-204(*n*), or the client devices 208(1)-208(*n*), for example, may be configured to operate as virtual instances on the same physical machine. In other words, one or more of the SCPD 202, the server devices 204(1)-204(*n*), or the client devices 208(1)-208(*n*) may operate on the same physical device rather than as separate devices communicating through communication network(s) 210. Additionally, there may be more or fewer SCPDs 202, server devices 204(1)-204(*n*), or client devices 208(1)-208(*n*) than illustrated in FIG. 2.

In addition, two or more computing systems or devices may be substituted for any one of the systems or devices in any example. Accordingly, principles and advantages of distributed processing, such as redundancy and replication, may also be implemented, as desired, to increase the robustness and performance of the devices and systems of the examples. The examples may also be implemented on computer system(s) that extend across any suitable network using any suitable interface mechanisms and traffic technologies, including by way of example only tele traffic in any suitable form (e.g., voice and modem), wireless traffic networks, cellular traffic networks, packet data networks (PDNs), the Internet, intranets, and combinations thereof.

Figure 3:
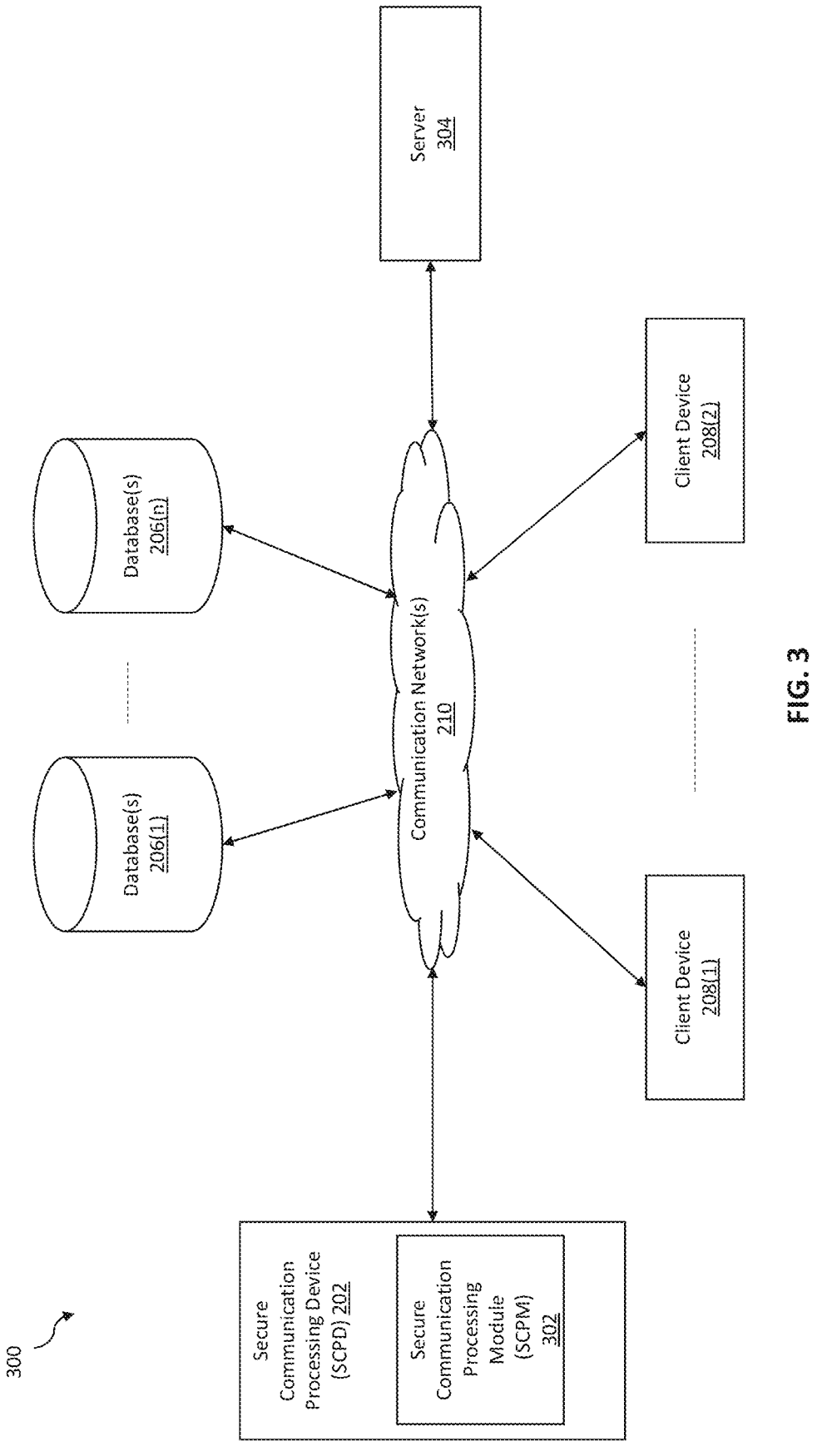
FIG. 3 illustrates an exemplary system for providing a secure communication, in accordance with an exemplary embodiment of the present disclosure.

FIG. 3 illustrates an exemplary system for implementing a method for providing a secure communication, in accordance with an exemplary embodiment. As illustrated in FIG. 3, the system 300 may include a secure communication processing device (SCPD) 202 within which a secure communication processing (SCP) module (SCPM) 302 is embedded, a server 304, a database(s) 206(1) . . . 206(*n*), a plurality of client devices 208(1) . . . 208(2), and a communication network(s) 210.

According to exemplary embodiments, the system 300 may comprise the secure communication processing device (SCPD) 202 including the SCPM 302 may be connected to the server 304 and the database(s) 206(1) . . . 206(*n*) via the communication network(s) 210, but the disclosure is not limited thereto. The SCPD 202 may also be connected to the plurality of client devices 208(1) . . . 208(2) via the communication network(s) 210, but the disclosure is not limited thereto. The database(s) 206(1) . . . 206(*n*) may include a rule database.

In an embodiment, the SCPD 202 is described and shown in FIG. 3 includes the SCPM 302, although it may include other rules, policies, modules, databases, or applications, for example. As will be described below, the SCPM 302 is configured to carry out a method for providing secure communication.

An exemplary system 300 for implementing a mechanism to provide the secure communication by utilizing the network environment of FIG. 2 is shown as being executed in FIG. 3. Specifically, a first client device 208(1) and a second client device 208(2) are illustrated as being in communication with the SCPD 202. In this regard, the first client device 208(1) and the second client device 208(2) may be "clients" of the SCPD 202 and are described herein as such. Nevertheless, it is to be known and understood that the first client device 208(1) and/or the second client device 208(2) need not necessarily be "clients" of the SCPD 202, or any entity described in association therewith herein. Any additional or alternative relationship may exist between either or both of the first client device 208(1) and the second client device 208(2) and the SCPD 202, or no relationship may exist.

Further, the SCPD 202 is illustrated as being able to access one or more databases 206(1) . . . 206(*n*). The SCPM 302 may be configured to access these repositories/databases for implementing a method for providing a secure communication within an environment. In some embodiment, the server 304 may be the same or equivalent to the server device 204 as illustrated in FIG. 2.

The first client device 208(1) may be, for example, a smartphone. The first client device 208(1) may be any additional device described herein. The second client device 208(2) may be, for example, a personal computer (PC). The second client device 208(2) may also be any additional device described herein.

The process may be executed via the communication network(s) 210, which may comprise plural networks as described above. For example, in an exemplary embodiment, either or both the first client device 208(1) and the second client device 208(2) may communicate with the SCPD 202 via broadband or cellular communication. These embodiments are merely exemplary and are not limiting or exhaustive.

Referring to FIG. 4, an exemplary method 400 is shown for providing a secure communication, in accordance with an exemplary implementation. As shown in FIG. 4, the method begins following the need for the secure communication.

At step S402, the method includes receiving, by the at least one processor 104, a request to install an application for the secure communication between a first entity and a second entity. The first entity corresponds to a receiver of the message, and the second entity corresponds to a sender of the message, or vice versa. In an example, each of the first entity and the second entity may include a user, an organization, or a financial bank. In an implementation, the user may install the application on the user device associated with the user. In an example, the application is also referred to as the "Connect" application to securely connect one user with another user.

In an exemplary implementation, the application may be secured using a multifactor authentication (MFA), such as, but not limited to, a biometric-based authentication, a fingerprint-based authentication, a face recognition-based authentication, a pin-based authentication, and the like.

At step S404, the method includes generating, by the at least one processor 104, a certificate for the secure communication between the first entity and the second entity. In an implementation, generating the certificate corresponds to an importation of the certificate from a certificate authority or any vendor. In an example, the certificate is imported or uploaded into the application to secure the communication between the first entity and the second entity. In another implementation, generating the certificate corresponds to the generation of its own certificate at the installed application in an event there is a failure in importing or uploading the certificate from the certificate authority. As used herein, the certificate may include a cryptography file that is used to extract or generate public keys and private keys for making the connection secure. As used herein, a certificate authority (CA) is an entity that issues digital certificates containing public keys and private keys to establish trust and secure communications.

At step S406, the method includes extracting, by the at least one processor 104, a first key and a second key from the certificate. The certificate enables asymmetric encryption for the secure communication. In an implementation, the first key corresponds to a public key and the second key corresponds to a private key.

At step S408, the method includes sharing, by the at least one processor 104, the first key with the second entity for encryption of a message in the secure communication. The sharing of the first key, such as the public key, with the second entity may include receiving, by the at least one processor 104, a request from the first entity to securely connect with the second entity. The request may include providing a contact number or a code associated with the device of the second entity.

In an example, the first entity may enter the contact number of the second entity in the application to securely connect with the second entity. Next, the method may include sharing, by the at least one processor 104, the first key with the second entity for encryption of the message. Next, the method may include receiving, by the at least one processor 104, an acknowledgment from the second entity that indicates a successful receipt of the first key. Thus, the first entity shares the public key with the second entity. The second entity acknowledges the receipt of the public key to the first entity. The second entity encrypts the message using the public key and shares the encrypted message with the first entity. The first entity therefore decrypts the message using the private key. Similarly, the second entity may act as a receiver of the message and the first entity may act as a sender of the message.

At step S410, the method includes receiving, by the at least one processor 104, the encrypted message from the second entity. In an example, a connect application installed in a device of user B receives the public key from a connect application installed in a device of user A. The connect application installed in the device of user B acknowledges the receipt of the public key and thereafter sends the message for communication using the encryption mechanism e.g., using the received public key.

At step S412, the method includes decrypting, by the at least one processor 104, the encrypted message using the second key, such as, for example, a private key. In an example, the first party receives the encrypted message from the second party. Next, the first party may decrypt the encrypted message using the second key such as the private key.

At step S414, the method includes displaying, by the at least one processor 104 via a display 108, the decrypted message in the installed application. Further, after decrypting the encrypted SMS message using the private key, the first entity may access or read the received message from the second party within the application.

Figure 5:
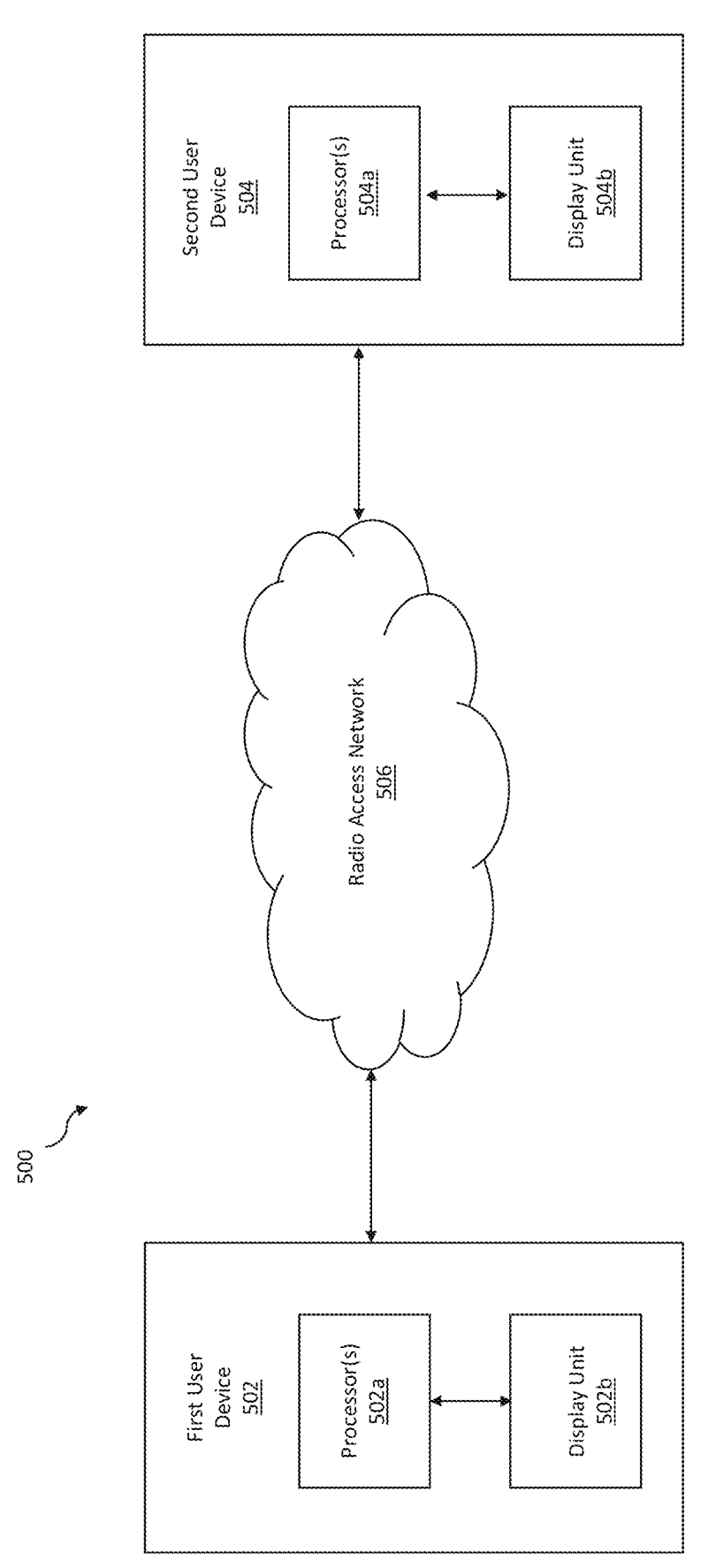
FIG. 5 illustrates a process flow diagram for implementing a method for providing a secure communication, in accordance with an exemplary embodiment of the present disclosure.

FIG. 5 illustrates a system for implementing a method for providing a secure communication, in accordance with an exemplary implementation. As illustrated in FIG. 5, the system includes a first user device 502, a second user device 504, and a radio access network (RAN) 506. The first user device 502, associated with a first entity, includes a processor 502*a* and a display unit 502*b*. The second user device 504, associated with a second entity, includes a processor 504*a* and a display unit 504*b*. The processor 502*a* of the first user device receives a request from a first user to install an application (e.g., a connect application) in a first user device 502. Similarly, the processor 504*a* of the second user device receives a request from a second user to install an application (e.g., a connect application) in the second user device 504. The application installed in the first user device and the second user device facilitates the secure communication between the first entity and the second entity.

It is to be noted that the invention is explained with respect to the first user device, however the same is applicable with respect to the second user device. Next, a certificate is generated by the processor 502*a* of the first user device 502 within the installed application, for securing the connection.

In an exemplary implementation, the processor 502*a* may generate the certificate by importing certificates from a third-party vendor or a certificate issuing authority. The processor 502*a* is further configured to secure the communication and generate its own certificate in case the certificate issuing authority fails to generate the certificate due to various factors.

In an example, the processor 502*a* is configured to extract a first key and a second key from the certificate. The first key and second key pair may be secure public and private key pairs respectively. In an example, a similar process flow is also performed at the second user device 504 with the processor 504a. In an example, the first key such as the public key is shared between the processor 502a of the first user device 502 and the processor 504a of the second user device 504a. The processor 502a of the first user device 502 sends a handshake flag and its generated public key and in response to this, the processor 504a of the second user device 504 sends an acknowledgment and its public keys. In an example, after the successful sharing of the first key such as the public key, the first user device 502 and the second user device 504 may communicate with encrypted messages. The encrypted messages may be decrypted with the second key such as the private key of corresponding user devices. The encrypted messages may be accessed or read using display 502a (also referred to as display unit) of the first user device 502 and the display 504a of the second user device 504. In an exemplary implementation, the exchange of keys and messages between the first user device and the second user device is performed via a radio access network (RAN) 506.

In an example, if a user loses the user device, there is no need for concern due to the presence of multi-factor authentication and fingerprint authentication required to access the application on the device. Furthermore, even if a third party (e.g., a thief) transfers the subscriber identity module (SIM) card to a different device, the SMS messages remain encrypted and may not be decrypted. The private key is held on the application itself. Moreover, if the third party (e.g., a thief) attempts to send a message related to SMS banking, balance checking, or balance transfer, the message may be encrypted first and then sent to the bank. However, in response, when the bank sends a One-Time Password (OTP), the OTP is always encrypted using the public key associated with the user's device. As a result, the thief would be unable to decrypt or view the message. This feature enhances the security and trustworthiness of the communication system.

Figure 6:
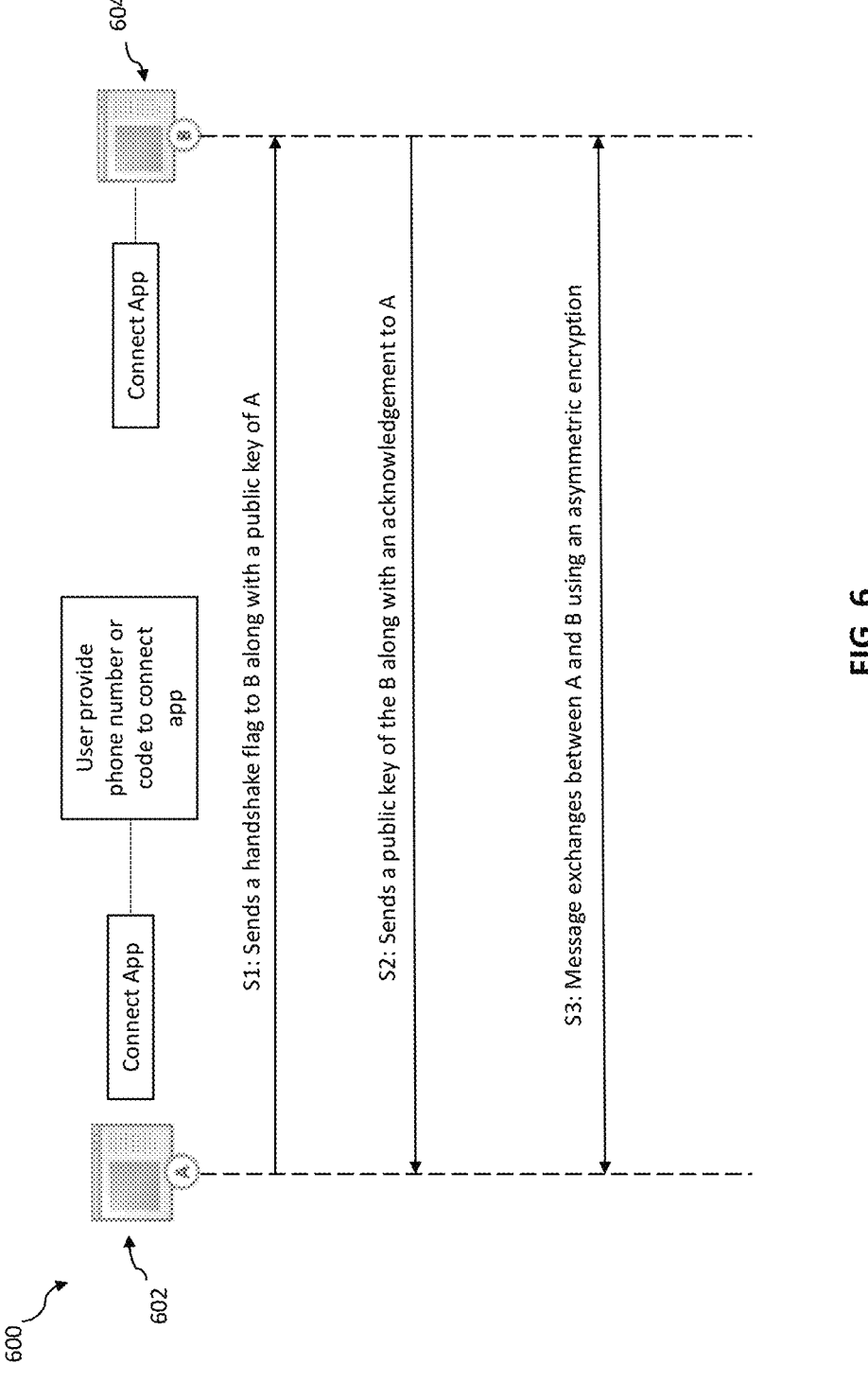
FIG. 6 illustrates a process flow diagram for implementing a method for providing a secure communication between a first entity and a second entity, in accordance with an exemplary embodiment of the present disclosure.

FIG. 6 illustrates a process flow diagram for implementing a method for providing a secure communication between a first entity and a second entity, in accordance with an exemplary implementation of the present disclosure. As illustrated in FIG. 6, process flow 600 begins with receiving a request to install an application (e.g., connect application) on a first user device 602 (also referred to as device A) associated with the first entity. Similarly, a request may be received from the second entity to install the application on the second user device 604 (also referred to as device B). It is to be noted that end users or consumers are required to install the application for the secure communication. The application is supported with a multi-factor authentication (MFA) and fingerprint enablement. The first user device 602 either generates its certificate within the application or imports the certificate from a third-party vendor or a certificate issuing authority. The application is configured with the capability to even work without any internet connection based on a short message service (SMS) protocol.

In an exemplary implementation, the first user associated with the first user device 602 provides a phone number or code to 'connect application' so that the first user may connect with the second user for the secure communication. The second user is associated with the second user device. The phone number of the second user is provided by the first user to connect with the second user. Next, a certificate is generated for the secure communication between the first user device 602, and the second user device 604. The certificate allows asymmetric encryption (e.g., private-public-key) to secure the communication. In an implementation, at least one processor associated with the first user device extracts a first key (e.g., a public key) and a second key (e.g., a private key) from the certificate.

Once the application is installed and the certificate is generated on at least the first user device and the second user device, the process starts. At step S1, the first user device 602 (also referred to as device A) sends a handshake flag or signal along with its public key using an SMS service. At step S2, the second user device 604 (also referred to as device B) sends an acknowledgment along with its public key to the first user device 602 using the SMS service. Thus, both the user devices have public keys to encrypt messages. In an implementation, the first user device 602 and the second user device 604 share corresponding public keys with each other for encryption of messages during communication and store the private keys in the associated application for decryption of the messages. Next in step S3, the first user device 602, and the second user device 604 exchange messages using asymmetric encryption where the public keys are used to encrypt the messages, and the private keys are used to decrypt the messages. Thus, the first user securely connects with the second user for the secure communication.

An example of a bank communicating with a customer using the features of the present disclosure is explained as follows:

---

Communication with a handshake using asymmetric encryption

Bank: hello user
[The step above indicates a scenario where the bank wants to send a message "hello user" to the user's device]
Bank:
Bank-to-User:
ConnectOpen_userkey1_bankkey1_MIIBIjANBgkqhkiG9w0BAQEFAAOCAQ8AMII
BCgKCAQEAn4sY5F98b85kFZoXFJTrMxdB5urxoSosQtnwLac9/Ooz2l2135kjlTsJl4
7WTSxRnIc+u6//GolZBossgBIcxg4hiciKVSLAMhvKbfBaS51L/L/mVEa4XTAktOFh/
tVmLqVrSM9dy3pf4e4y5M3a/zcXte/EFf6r16zUbYf5fgH+apzLYYSjSEaPiWXQjDf
SdRMtMXQcE8Ud/Ot/9F0ah1qd2lVAmfxs1yoZKyV/yJhs1T9VH9cDZ5XR5vi0G1D
H1ojK8k1co9+2Y0ApcyTnpNNcxiFoHiZUmjWfznCD/qcdCijI6d81vrsLAPp67pgLM
hm8KJ/8EppO3Ll6rJiX/wIDAQAB
[The step above indicates the transmission of a public key from the bank to the user's device]
User-to-Bank:
ConnectMeWith_bankkey1_userkey1_MIIBIjANBgkqhkiG9w0BAQEFAAOCAQ8A
MIIBCgKCAQEAxPu0tmRrMzhwEKY/Oo+3JjjhJwP0RpGEKUADnVm/nj/4tCEmG
kaqRsVHb387bFqDiT0mUPYFF9PR4z1Zyqiv+LqwUwFv2FpO9XxYkZLiHEyjqqB
wv9sduXIGlEl8x+eTxZeYiYet4ybDkN/5qJFd+eFSENZZdIrms6bgRgd5BHY9PM5X -continued

---

Communication with a handshake using asymmetric encryption

---

1YpWD3U9StfV5uJHVRDrYEjcCPsXzzi1k26B0AA8M1MEepee/n2cdEJ3PZSS0xv
VWjk5J0KYVJjqnQl3uB18PzSWE/c/xJHRVb7EO5FPiM2yr0Mc+3Q3mtHdwmTba2
NLMWw/fBEhh/5mm6b57p5FLA5wPG9NsfC70y1AWwIDAQAB
[The step above indicates the transmission of a public key from the user's device to the
bank]
Bank-to-User: ConnectSuccess_userkey1_bankkey1
[The step above indicates a notification from the bank to the user's device about the
successful exchange of keys between the bank and the user's device]
User-to-Bank: Connection Established with Bank.
[The step above indicates the user's acknowledgment to the bank of a successful
connection status between the user's device and the bank]
Bank-to-User: Connection Established with User.
[The step above indicates the bank's acknowledgment to the user's device of a
successful connection status between the bank and the user's device]
Bank-to-User:
ConnectMessage_userkey1_bankkey1_Ytf6KloZL3Cu5yaSH1nY7IhueP3KTWVZbeH
kHLpOh7gsSCsOD77zhY4aq4B9y8EOWTEtWgcNzhWilAKVcCnrtPtBIS0vE9k6NG
kyq0WZlnqsRUFIF2P7Qu9WSuh34BJjZBcabjRJP9PK4ovdGOofqLWywSUyNBbO
Wgicp4VkxEX907wC9LUNPDKdaiay7yThqpUPn87fin6DGZIYDcXjOf2md1f5tc8pJ
YhI8xTvDr9VWGOggMHeUNR0Kmn2k4sZdsgiHCBneCXazBJb2OurcBJsh5uGkvU
tiIBVWc9Z3EXLlUOpyXiaD0TwQT9T4M2X/XDI4o1pTeoiKLFnVPyCPg==
[The step above indicates transmission of the encrypted message "hello" from the bank
to the user after a successful connection. The message is encrypted using the public key
received from the user during the handshake mechanism]
User:
ConnectMessage_userkey1_bankkey1_Ytf6KloZL3Cu5yaSH1nY7IhueP3KTWVZbeH
kHLpOh7gsSCsOD77zhY4aq4B9y8EOWTEtWgcNzhWilAKVcCnrtPtBIS0vE9k6NG
kyq0WZlnqsRUFIF2P7Qu9WSuh34BJjZBcabjRJP9PK4ovdGOofqLWywSUyNBbO
Wgicp4VkxEX907wC9LUNPDKdaiay7yThqpUPn87fin6DGZIYDcXjOf2md1f5tc8pJ
YhI8xTvDr9VWGOggMHeUNR0Kmn2k4sZdsgiHCBneCXazBJb2OurcBJsh5uGkvU
tiIBVWc9Z3EXLlUOpyXiaD0TwQT9T4M2X/XDI4o1pTeoiKLFnVPyCPg==
[The step above indicates reception of encrypted message "hello" at the user device
from the bank after a successful connection]
User: hello
[The step above indicates the display of the message after decrypting the message 'hello'
on the user's device using the private key stored in the application]

---

Accordingly, with this technology, a method and system for providing a secure communication is disclosed. As evident from the above disclosure, the present solution provides a significant technical advancement over existing solutions by enabling secure and confidential SMS communication between two parties without compromising sensitive personal information, financial information, and the like. The above-mentioned system and method provide encrypted communication between the two parties. The method and system of the present disclosure enable asymmetric encryption using a private-public key pair. For decrypting the secure encrypted message, the private key is required, which remains within Application A. The SMS messages remain in encrypted form within the SMS inbox and may not be accessed or read from the SMS inbox. The encrypted message may be accessed within Application A only after decryption. Therefore, any unauthorized person or any third-party application may not be able to access user-secured SMS messages. Further, when a user wants to send some multimedia items, the user often goes for some vendor site and uploads and shares the data on third-party social media applications, however, the connect application does not require any third-party apps to share or communicate data as the application uses plain old SMS channel point-to-point transfers. Therefore, as disclosed, the system achieves a better secure and confidential way to maintain SMS communication safe and protected and reduces the chances of any misuse and the like.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials, and embodiments, the invention is not intended to be limited to the particulars disclosed; rather the invention extends to all functionally equivalent structures, methods, and uses such as are within the scope of the appended claims.

For example, while the computer-readable storage medium may be described as a single medium, the term "computer-readable storage medium" includes a single medium or multiple media, such as a centralized or distributed database, and/or associated caches and servers that store one or more sets of instructions. The terms "computer-readable medium" and "computer-readable storage medium" shall also include any medium that is capable of storing, encoding, or carrying a set of instructions for execution by a processor or that causes a computer system to perform any one or more of the embodiments disclosed herein.

The computer-readable storage medium may comprise a non-transitory computer-readable storage medium or media and/or comprise a transitory computer-readable storage medium or media. In a particular non-limiting, exemplary embodiment, the computer-readable storage medium can include a solid-state memory such as a memory card or other package that houses one or more non-volatile read-only memories. Further, the computer-readable storage medium can be a random-access memory or other volatile re-writable memory. Additionally, the computer-readable storage medium can include a magneto-optical or optical medium, such as a disk or tape, or other storage device to capture carrier wave signals such as a signal communicated over a transmission medium. Accordingly, the present disclosure is considered to include any computer-readable storage medium or other equivalents and successor media, in which data or instructions may be stored.

Although the present application describes specific embodiments that may be implemented as computer programs or code segments in computer-readable storage media, it is to be understood that dedicated hardware implementations, such as application-specific integrated circuits, programmable logic arrays, and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

According to an aspect of the present disclosure, a non-transitory computer-readable storage medium storing instructions for providing a secure communication is disclosed. The storage medium includes executable code which, when executed by a processor 104, may cause the processor 104 to receive a request to install an application for the secure communication between a first entity and a second entity; generate a certificate for the secure communication between the first entity and the second entity; extract a first key and a second key from the certificate; share the first key with the second entity for encryption of a message in the secure communication; receive the encrypted message from the second entity; decrypt the encrypted message using the second key; and display, via a display, the decrypted message in the application.

Although the present specification describes components and functions that may be implemented in particular embodiments with reference to particular standards and protocols, the present disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to enable a general understanding of the various embodiments. The illustrations are not intended to serve as a complete description of all of the elements and features of apparatus and systems that utilize the structures or methods described herein. Many other embodiments may be apparent to those of skill in the art upon reviewing the present disclosure. Other embodiments may be utilized and derived from the present disclosure, such that structural and logical substitutions and changes may be made without departing from the scope of the present disclosure. Additionally, the illustrations are merely representational and may not be drawn to scale. Certain proportions within the illustrations may be exaggerated, while other proportions may be minimized. Accordingly, the present disclosure and the figures are to be regarded as illustrative rather than restrictive.

One or more embodiments of the present disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the present disclosure is submitted with the understanding that it will not be used to interpret or limit the scope or meaning of the claims. In addition, in the foregoing detailed description, various features may be grouped together or described in a single embodiment for the purpose of streamlining the present disclosure. This disclosure is not to be interpreted as reflecting an intention that the claimed embodiments require more features than are expressly recited in each claim. Rather, as the following claims reflect, the inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

I claim:

1. A method for providing a secure communication, the method being implemented by at least one processor, the method comprising:

receiving, by the at least one processor, a request to install an application for the secure communication between a first entity and a second entity;

generating, by the at least one processor, a certificate for the secure communication between the first entity and the second entity;

extracting, by the at least one processor, a first key and a second key from the certificate;

sharing, by the at least one processor, the first key with the second entity for encryption of a message in the secure communication;

receiving, by the at least one processor, the encrypted message from the second entity;

decrypting, by the at least one processor, the encrypted message using the second key; and displaying, by the at least one processor via a display, the decrypted message in the application.

2. The method as claimed in claim 1, wherein when the first entity corresponds to a receiver of the message, the second entity corresponds to a sender of the message; and when the second entity corresponds to the receiver of the message, the first entity corresponds to the sender of the message.

3. The method as claimed in claim 1 further comprising securing, by the at least one processor, the application with at least one authentication factor.

4. The method as claimed in claim 1, wherein the generating of the certificate corresponds to an importing of the certificate from a certificate authority.

5. The method as claimed in claim 1, wherein the first key corresponds to a public key and the second key corresponds to a private key.

6. The method as claimed in claim 1, wherein the sharing of the first key with the second entity comprises:

receiving, by the at least one processor from the first entity, a request to securely connect with the second entity;

sharing, by the at least one processor, the first key with the second entity for encryption of the message; and receiving, by the at least one processor from the second entity, an acknowledgment that indicates a successful receipt of the first key.

7. A computing device configured to implement an execution of a method for providing a secure communication, the computing device comprising:

a processor;

a memory; and a communication interface coupled to each of the processor and the memory, wherein the processor is configured to:

receive a request to install an application for the secure communication between a first entity and a second entity;

generate a certificate for the secure communication between the first entity and the second entity;

extract a first key and a second key from the certificate;

share the first key with the second entity for encryption of a message in the secure communication;

receive the encrypted message from the second entity;

decrypt the encrypted message using the second key; and display, via a display, the decrypted message in the application.

8. The computing device as claimed in claim 7, wherein when the first entity corresponds to a receiver of the message, the second entity corresponds to a sender of the message; and when the second entity corresponds to the receiver of the message, the first entity corresponds to the sender of the message.

9. The computing device as claimed in claim 7, wherein the processor is further configured to secure the application with at least one authentication factor.

10. The computing device as claimed in claim 7, wherein the generation of the certificate corresponds to an importation of the certificate from a certificate authority.

11. The computing device as claimed in claim 7, wherein the first key corresponds to a public key and the second key corresponds to a private key.

12. The computing device as claimed in claim 7, wherein the processor is further configured to perform the sharing of the first key with the second entity by:

receiving a request from the first entity to securely connect with the second entity;

sharing the first key with the second entity for encryption of the message; and receiving an acknowledgment from the second entity that indicates a successful receipt of the first key.

13. A non-transitory computer readable storage medium storing instructions for providing a secure communication, the storage medium comprising executable code which, when executed by a processor, causes the processor to:

receive a request to install an application for the secure communication between a first entity and a second entity;

generate a certificate for the secure communication between the first entity and the second entity;

extract a first key and a second key from the certificate;

share the first key with the second entity for encryption of a message in the secure communication;

receive the encrypted message from the second entity;

decrypt the encrypted message using the second key; and display, via a display, the decrypted message in the application.

14. The storage medium as claimed in claim 13, wherein when the first entity corresponds to a receiver of the message, and the second entity corresponds to a sender of the message; and when the second entity corresponds to the receiver of the message, the first entity corresponds to the sender of the message.

15. The storage medium as claimed in claim 13, wherein when executed by the processor, the executable code further causes the processor to secure the application with at least one authentication factor.

16. The storage medium as claimed in claim 13, wherein the generation of the certificate corresponds to an importation of the certificate from a certificate authority.

17. The storage medium as claimed in claim 13, wherein the first key corresponds to a public key and the second key corresponds to a private key.

18. The storage medium as claimed in claim 13, wherein when executed by the processor, the executable code further causes the processor to perform the sharing of the first key with the second entity by:

receiving a request from the first entity to securely connect with the second entity;

sharing the first key with the second entity for encryption of the message; and receiving an acknowledgment from the second entity that indicates a successful receipt of the first key.

* * * * *